United States Patent
Aaron

(10) Patent No.: US 8,640,260 B2
(45) Date of Patent: *Jan. 28, 2014

(54) METHODS, SYSTEMS AND PRODUCTS FOR DISTRIBUTING DIGITAL CONTENT

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,120

(22) Filed: May 11, 2012

(65) Prior Publication Data

US 2012/0222138 A1    Aug. 30, 2012

Related U.S. Application Data

(63) Continuation of application No. 12/963,395, filed on Dec. 8, 2010, now Pat. No. 8,191,165, which is a continuation of application No. 11/432,917, filed on May 12, 2006, now Pat. No. 7,874,015.

(51) Int. Cl.
*G06F 21/22* (2006.01)
*H04N 7/16* (2011.01)
*H04L 9/32* (2006.01)

(52) U.S. Cl.
USPC ............ 726/30; 713/165; 713/179; 705/59

(58) Field of Classification Search
None
See application file for complete search history.

(56) References Cited

U.S. PATENT DOCUMENTS

| | | | |
|---|---|---|---|
| 7,353,402 | B2 | 4/2008 | Bourne et al. |
| 7,404,110 | B1 | 7/2008 | Johnson |
| 7,568,096 | B2 | 7/2009 | Evans et al. |
| 7,581,255 | B2 | 8/2009 | Alkove et al. |
| 7,630,997 | B2 | 12/2009 | Zhang et al. |
| 7,874,015 | B2 | 1/2011 | Aaron |
| 7,899,205 | B2 | 3/2011 | Pelly et al. |
| 8,191,165 | B2 * | 5/2012 | Aaron ............................ 726/30 |
| 2002/0131450 | A1 | 9/2002 | Yoshida |
| 2005/0240533 | A1 | 10/2005 | Cutter et al. |
| 2007/0078775 | A1 | 4/2007 | Huapaya et al. |
| 2007/0156598 | A1 | 7/2007 | Yoon et al. |
| 2008/0005027 | A1 * | 1/2008 | Mullins .......................... 705/51 |
| 2008/0060085 | A1 | 3/2008 | Samzelius et al. |
| 2008/0270311 | A1 | 10/2008 | Peterka et al. |

* cited by examiner

*Primary Examiner* — Christopher Revak
(74) *Attorney, Agent, or Firm* — Scott P. Zimmerman, PLLC

(57) ABSTRACT

Methods, systems, and products distribute digital content based on digital rights license. A digital file may be fragmented into a plurality of unusable fragments. Each unusable fragment is separately unusable. Each unusable fragment may be tagged with a tag to generate tagged unusable fragments. The digital rights license is generated based on the tag, such that the tagged unusable fragments may be reassembled into the digital file.

20 Claims, 5 Drawing Sheets

METHODS, SYSTEMS AND PRODUCTS FOR DISTRIBUTING DIGITAL CONTENT

CROSS REFERENCE TO RELATED APPLICATIONS

This application is a continuation of U.S. application Ser. No. 12/963,395, filed Dec. 8, 2010, now issued as U.S. Pat. No. 8,191,165, which is a continuation of U.S. application Ser. No. 11/432,917, now issued as U.S. Pat. No. 7,874,015, with both applications incorporated herein by reference in their entireties.

FIELD OF THE INVENTION

The present invention relates to the sharing of digital content over computer networks.

BACKGROUND OF THE INVENTION

Peer-to-peer (P2P) systems, sometimes known as file sharing systems, may break a file into many pieces, or fragments, which may be distributed to different locations in a computer network and then reassembled at a user location when a user desires to access the file. For example, digital media files may be fragmented and distributed over computer networks such as the worldwide web and/or other wireless and/or mobile networks. As such, each file fragment may be provided to a user from many different network locations. In distributed form, the entire file may not be present in any one network location; rather, only one or a few fragments may be stored at any particular location. Thus, the fragments of the file may be generally unusable until reassembled or reconstituted.

For example, BitTorrent is the name of P2P file distribution protocol designed to widely distribute large amounts of data without incurring the corresponding consumption in server and bandwidth resources. In particular, the BitTorrent protocol breaks a file down into smaller fragments, typically about 256 kilobytes (KB) in size. Peers may download missing fragments from each other, and may upload fragments to peers that request them. For instance, users may be provided with a torrent file, which may contain the filename, size, and a checksum/hash of each fragment in the file. The torrent file may be distributed to users, for example, via e-mail or via a website. The torrent file may also tell the client the address of a tracker server, which, in turn, maintains a log of which users are downloading the file and where the file and its fragments reside.

In conventional P2P systems, the file fragments may not be downloaded in sequential order, and thus may need to be reassembled by the receiving machine. Accordingly, identification information, sometimes called "tags", may be applied to each fragment so that a file fragmentation and reconstitution system can identify the fragments as belonging to a particular file. More particularly, the fragments may be "tagged" to aid in management and/or control of distribution, storage, and/or transfers of the fragments/tags, and/or reassembly/reconstitution of the original file. Thus a system can appropriately select, transfer, and reconstitute the fragments of a particular file to provide the actual file based on the tags. However, unless fragments become lost or otherwise corrupted, the fragments and the tags may typically be static, such that they may not be intentionally modified by the system. In addition, the identifiers, version numbers, and other information embedded in the tags may be easily decipherable. As such, conventional file fragmentation systems and/or files transferred thereby may be susceptible to tampering and/or alteration by unauthorized parties, also known as "hackers".

In addition, due to the proliferation of file sharing over such computer networks, concerns have been raised by owners of copyright and/or other intellectual property rights in digital media products. These concerns have led to the use and/or proposal of digital rights management (DRM) technologies. DRM provides for secure distribution of digital content. In particular, DRM may allow users to access only files which they are authorized to access, and only in the forms or manner for which they are so authorized. The basic components of DRM technology may include the digital multimedia content, which may be transferred between the content provider and a user in a secure fashion, and the rights, which may represent the permissions, obligations, and/or constraints associated with the use of the digital media content. For example, the rights may take the form of a separate encryption key, which may be provided to the user directly or via the same system as the file itself. The key may be required to be available to a device in order to enable rendering of the digital multimedia content. However, the encryption and decryption steps may be computationally demanding, which may become an increasingly critical problem as the scale of such a system is increased.

SUMMARY OF THE INVENTION

According to some embodiments of the present invention, a method for controlling distribution of digital content includes fragmenting a digital content file into a plurality of fragments, and tagging at least some of the plurality of fragments with corresponding ones of a plurality of tags to provide a plurality of tagged fragments for distribution. A digital rights license is generated for the digital content file based on the plurality of tags and/or fragments. The digital rights license is configured to allow reassembly of the plurality of tagged fragments to provide the digital content file.

In some embodiments, the method may further include generating the plurality of tags to respectively include digital rights management (DRM) information therein. As such, the digital rights license may be generated based on the DRM information contained in the plurality of tags.

In other embodiments, the digital rights license may be generated to include a plurality of representations respectively derived from the plurality of tags and/or fragments. The digital rights license may be configured to prevent re-assembly of the plurality of tagged fragments if a representation derived from one of the plurality of tagged fragments does not match a corresponding one of the plurality of representations included in the digital rights license. For example, the plurality of representations may include a hash result obtained by grouping of portions of the plurality of tags and/or fragments and/or a plurality of hash results respectively derived therefrom. The digital rights license may also be configured to prevent further reception of ones of the plurality of tagged fragments if the representation derived from the one of the plurality of tagged fragments does not match the corresponding one of the plurality of representations included in the digital rights license.

In some embodiments, the plurality of tags may respectively include sequencing information based on a predetermined sequence of re-assembly of the plurality of tagged fragments. As such, to generate the digital rights license, at least a portion of one of the plurality of tags and/or fragments may be combined with at least a portion of ones of the plurality of tags and/or fragments preceding the one of the plurality of tags and/or fragments in the predetermined sequence to provide a combination thereof, and the combination may be hashed to provide a hash result corresponding to the one of the plurality of tags and/or fragments. The combining and hashing may be repeated for at least some of the plurality of tags and/or fragments to provide an ordered set of hash results corresponding to the at least some of the plurality of tags and/or fragments based on the sequencing information included therein, and the digital rights license may be generated to include the ordered set of hash results. Accordingly, the digital rights license may be configured to prevent re-assembly of the plurality of tagged fragments if a hash result obtained by hashing a combination of at least a portion of one of the plurality of tagged fragments and at least a portion of preceding ones of the plurality of tagged fragments based on the predetermined sequence does not match a corresponding one of the ordered set of hash results included in the digital rights license.

In other embodiments, the plurality of tags may respectively include sequencing information based on a predetermined sequence of re-assembly of the plurality of tagged fragments. As such, to generate the digital rights license, at least a portion of one of the plurality of tags and/or fragments may be combined with a hash result corresponding to a preceding one of the plurality of tags and/or fragments based on the predetermined sequence to provide a combination thereof, and the combination may be hashed to provide a hash result corresponding to the one of the plurality of tags and/or fragments. The digital rights license may be generated to include the hash result, and may be configured to prevent re-assembly of the plurality of tagged fragments if a hash result obtained by hashing a combination of at least a portion of one of the plurality of tagged fragments and a hash result corresponding to a preceding one of the plurality of tagged fragments based on the predetermined sequence does not match the hash result included in the digital rights license.

In some embodiments, a method of reassembling the plurality of tagged fragments to provide the digital content file using the generated digital rights license may be provided. More particularly, ones of the plurality of tagged fragments of the digital content file may be retrieved from one or more fragment storage locations according to a file sharing protocol, and the digital rights license for the digital content file may be received responsive to payment therefore. The ones of the plurality of tagged fragments may be reassembled to provide the digital content file based on a tag-by-tag verification of ones of a plurality of tags respectively obtained from the ones of the plurality of tagged fragments using the digital rights license.

In other embodiments, after some time, the digital content file may be fragmented into a second plurality of fragments that is different from the first plurality of fragments. At least some of the second plurality of fragments may be tagged with corresponding ones of a second plurality of tags to provide a second plurality of tagged fragments for distribution. Also, a second digital rights license may be generated for the digital content file based on the second plurality of tags. As such, the first plurality of tagged fragments and/or the first digital rights license may be invalidated after providing the second plurality of tagged fragments.

In some embodiments, a pseudo-random number (PRN) bit sequence may be generated using a predetermined PRN generation algorithm, and the plurality of tags may be generated to respectively include different portions of the pseudo-random number bit sequence and/or respective representations thereof to randomize information contained in the plurality of tags. Also, the digital rights license may be generated to include a sequence definition therein. The sequence definition may include information relating to the predetermined PRN algorithm. As such, the digital rights license may be configured to allow reassembly of the plurality of tagged fragments based on regeneration of the PRN bit sequence using the sequence definition contained therein.

According to other embodiments of the present invention, a method for controlling distribution of digital content includes fragmenting a digital content file into a first plurality of fragments, and tagging ones of the first plurality of fragments with corresponding ones of a first plurality of tags to provide a first plurality of tagged fragments for distribution. Later, ones of the first plurality of fragments are re-tagged with corresponding ones of a second plurality of tags to provide a second plurality of tagged fragments for distribution that is different from the first plurality of tagged fragments. For example, ones of the first plurality of fragments may be re-tagged after a predetermined period of time.

In some embodiments, after tagging but prior to re-tagging, the digital content file may be re-fragmented into a second plurality of fragments. For example, the digital content file may be re-fragmented into numbers of fragments and/or fragment sizes that are different from that of the first plurality of fragments. As such, the second plurality of fragments may be re-tagged with corresponding ones of the second plurality of tags to provide the second plurality of tagged fragments for distribution that is different from the first plurality of tagged fragments. The second plurality of fragments may be compared with the first plurality of fragments to verify that the second plurality is different from the first plurality of fragments.

In other embodiments, fragment storage locations for the second plurality of tagged fragments may be identified responsive to re-fragmenting and re-tagging.

In some embodiments, the first plurality of tagged fragments may be invalidated after the re-tagging. For example, the first plurality of tagged fragments may respectively include a fragmentation version number configured to identify the first plurality of tagged fragments responsive to generation of the second plurality of tagged fragments.

In other embodiments, a first digital rights license for the digital content file may be generated based on the first plurality of tags and/or fragments responsive to fragmenting and tagging. The first digital rights license may be configured to allow reassembly of the first plurality of tagged fragments to provide the digital content file. Later, a second digital rights license for the digital content file may be generated based on the second plurality of tags and/or fragments responsive to the re-tagging. The second digital rights license may be configured to allow reassembly of the second plurality of tagged fragments to provide the digital content file. In addition, the second digital rights license may be configured to prevent reassembly of the first plurality of tagged fragments after the re-tagging. As such, the first digital rights license may be invalidated after the retagging. For example, an instruction may be provided to delete the first digital rights license after a predetermined period of time and/or responsive to distribution of a predetermined number of copies of the first and/or second digital rights licenses.

In some embodiments, the first digital rights license may be generated using a first hashing method. In contrast, the second digital rights algorithm may be generated using a second hashing method that is different from the first hashing method.

According to further embodiments of the present invention, a method for controlling distribution of digital content includes fragmenting a digital content file into a plurality of fragments. A plurality of tags respectively corresponding to the plurality of fragments is generated using a pseudo-random number (PRN) bit sequence. At least some of the plurality of fragments are tagged with corresponding ones of the plurality of tags to provide a plurality of tagged fragments for distribution.

In some embodiments, to generate the plurality of tags, the PRN bit sequence may be generated using a predetermined PRN generation algorithm. The generated PRN bit sequence may be divided into a plurality of data fields. Respective identification information corresponding to respective ones of the plurality of fragments may be correlated to respective ones of the plurality of data fields of the PRN bit sequence using a predetermined correlation scheme. Respective ones of the plurality of tags corresponding to the respective ones of the plurality of fragments may be populated with the respective ones of the plurality of data fields and/or respective representations thereof responsive to correlating to randomize the identification information.

In other embodiments, the respective identification information may be correlated to sequential ones of the plurality of data fields based on a predetermined sequence of reassembly for the plurality of fragments. In addition, the respective identification information may be correlated to particular ones of the plurality of data fields based on an information type of the respective identification information. For example, the plurality of data fields may be grouped into a plurality of groups. A first type of information may be correlated to first ones of the data fields in each of the groups, and a second type of information may be correlated to second ones of the data fields in each of the groups.

In some embodiments, the identification information may include digital rights management (DRM) information that is configured to allow reassembly of the plurality of tagged fragments to provide the digital content file, and/or sequencing information that is configured to indicate a predetermined sequence of reassembly for the plurality of tagged fragments.

In other embodiments, a decoding file may be generated for distribution separately from the plurality of tagged fragments. The decoding file may be configured to allow recovery of the plurality of identification information based on regeneration of the PRN bit sequence and/or the predetermined correlation scheme.

In some embodiments, the plurality of tags may be generated to respectively include different portions of the PRN bit sequence and/or respective representations thereof based on a predetermined starting point in the PRN bit sequence. As such, a sequence definition may be provided for distribution separately from the plurality of tagged fragments. The sequence definition may be configured to allow regeneration and synchronization of the PRN bit sequence for reassembly of the plurality of tagged fragments to provide the digital content file.

In other embodiments, a method of reassembling the plurality of tagged fragments to provide the digital content file based on regeneration of the PRN bit sequence and recovery of the respective identification information for the plurality of fragments may be provided using the generated decoding file. For example, the PRN bit sequence may be re-generated using the predetermined PRN algorithm responsive to receiving the sequence definition for the digital content file. The predetermined starting point of the PRN bit sequence may be synchronized based on the received sequence definition. Ones of the plurality of identification information may be recovered from ones of a plurality of tags respectively obtained from received ones of the plurality of tagged fragments using the received decoding file. As such, the received ones of the plurality of tagged fragments may be reassembled based on the recovered ones of the plurality of information.

In some embodiments, a digital rights license may be generated based on the plurality of tags and/or fragments. The digital rights license may also include the predetermined correlation scheme. As such, the digital rights license may be configured to allow reassembly of the plurality of tagged fragments to provide the digital content file.

Other methods, systems, and/or computer program products according to other embodiments of the invention will become apparent to one with skill in the art upon review of the following drawings and detailed description. It is intended that all such additional methods, systems, and/or computer program products be included within this description, be within the scope of the present invention, and be protected by the accompanying claims.

DETAILED DESCRIPTION OF EMBODIMENTS OF THE INVENTION

Figure 1:
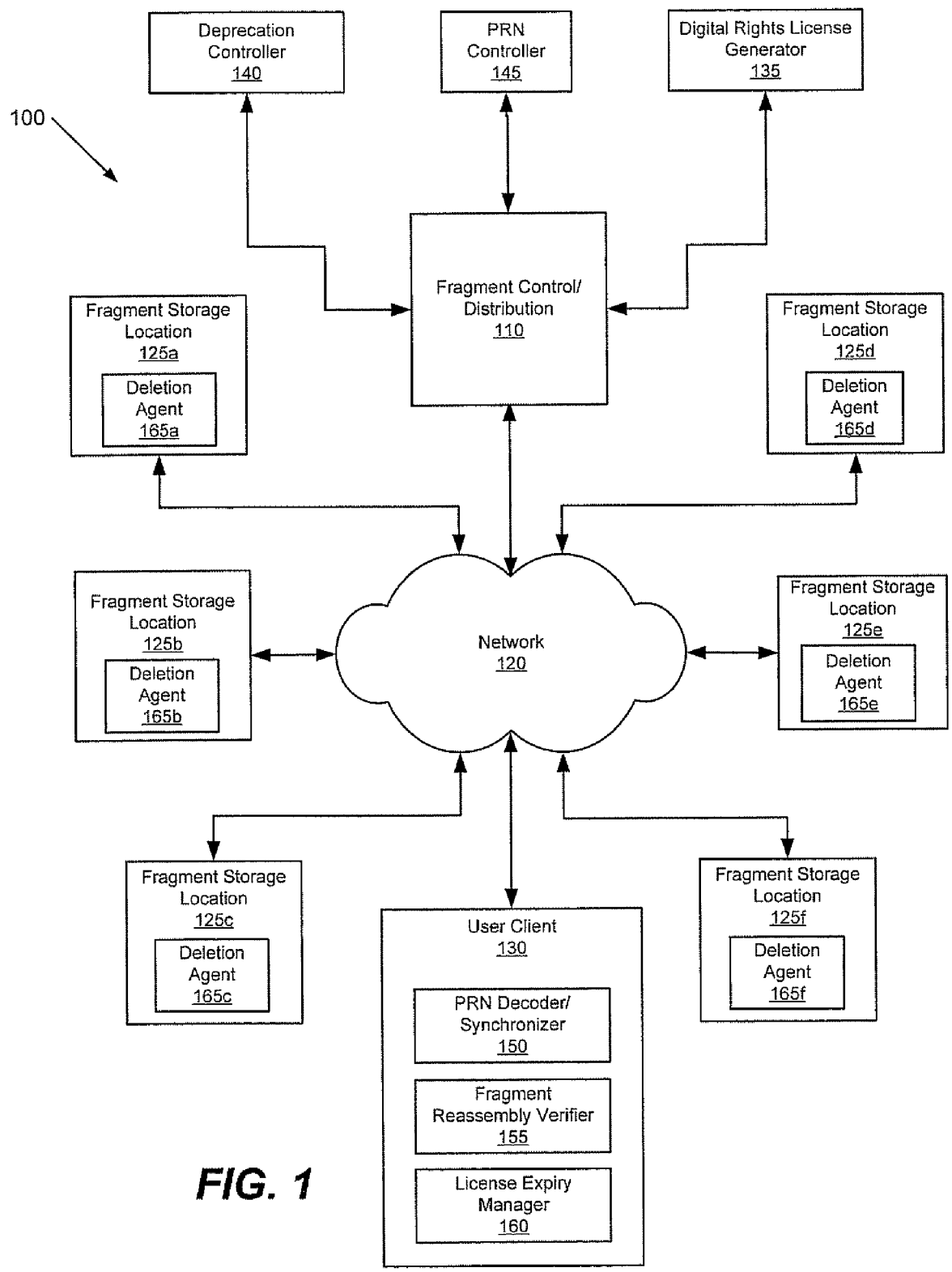
FIG. 1 is a block diagram illustrating systems, methods, and computer program products for controlling distribution of digital content according to some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups based or derived therefrom. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first plurality of fragments could be termed a second plurality of fragments, and, similarly, a second plurality of fragments could be termed a first plurality of fragments without departing from the teachings of the disclosure.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and devices in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the present invention may arise from realization that traditional encryption-based digital rights management (DRM) may be costly and/or computationally-demanding. As such, some embodiments of the present invention utilize a fragmentation/reconstitution system to provide a form of more efficient and less costly non-traditional DRM, which need not be based entirely on encryption and/or rights-controlled decryption.

Other embodiments of the present invention may arise from realization that, due to the static operation of conventional fragmenting and tagging systems, such systems may be vulnerable to attacks from hackers and/or other unauthorized parties. Accordingly, other embodiments of the present invention provide for updating and/or refreshing the fragments and/or tags after predetermined periods of time, thereby reducing the period during which the fragments and/or tags are valid. For example, by updating and/or refreshing of the file fragments and/or tags that are distributed and transferred, an unauthorized party would have to attack a "moving target", which may be considerably more difficult.

Further embodiments of the present invention may arise from realization that conventional file sharing systems may be vulnerable to attack based on other system information which may be stored in the tags. Accordingly, further embodiments of the present invention provide for obscuring the workings of the file sharing system by randomizing the information stored in each tag. By obscuring the workings of the system in such a manner, a considerably greater effort may be required to figure out how to attack and/or compromise the system.

FIG. 1 is a block diagram illustrating systems, methods, and computer program products for controlling distribution of digital content according to some embodiments of the present invention. Referring now to FIG. 1, a file sharing system 100 includes a fragment control/distribution block 110, a plurality of fragment storage locations 125a-125f, and a user/client 130. For example, the file sharing system 100 may be a peer-to-peer (P2P) system. The fragment control/distribution block 110 is configured to divide a digital content file into fragments, form associated tags for each of the fragments, and distribute the tagged fragments to the plurality of fragment storage locations 125a-125f and/or to the user/client 130 according to a file sharing protocol. For example, the fragment control/distribution block 110 may transmit the tagged fragments to the fragment storage locations 125a-125f and/or to the user/client 130 via a network 120. The user/client 130 may be, for example, user/client software, hardware, and/or firmware. The user/client 130 is configured to transmit a request for a desired digital content file over the file sharing system 100. More particularly, the user/client 130 is configured to requests that the desired file's fragments be forwarded from the fragment storage locations 125a-125f. The fragment storage locations 125a-125f may be part of and/or connected to the user/client 130 and/or other storage entities, for example, via the network 120. Upon receiving the fragments for the desired file, the user/client 130 is configured to reassemble and/or otherwise reconstitute the downloaded fragments to provide the desired digital content file.

The file sharing system 100 may also include a digital rights license generator 135. The digital rights license generator 135 is configured to generate a digital rights license based on the plurality of tags and/or fragments generated by the fragment control/distribution block 110. The digital rights license is also configured to allow reassembly of the plurality of tagged fragments to provide the digital content file, for example, based on a comparison of data included in the digital rights license with data included in each of the plurality of tagged fragments. In other words, the digital rights license is required to reconstitute the plurality of tagged fragments into the digital content file at a client, such as the user/client 130. The digital rights license generator 135 may be configured to distribute the digital rights license for a particular digital content file only to authorized clients, for example, responsive to payment for access to a desired digital content file. Accordingly, a client that does not have access to the digital rights license for a particular digital content file may be unable to reassemble the plurality of tagged fragments to provide the digital content file.

More particularly, the digital rights license generator 135 may be configured to generate the digital rights license to include a plurality of representations respectively derived from the plurality of tags and/or fragments. As such, the digital rights license may be configured to prevent re-assembly of the plurality of tagged fragments at a client if a representation derived from a tag and/or fragment (obtained from one of the plurality of tagged fragments) does not match a corresponding one of the plurality of representations included in the digital rights license. For example, the digital rights license generator 135 may be configured to generate additional information, such as digital rights management (DRM) information, to be included in each tag as an associated fragment is generated by the fragment control/distribution block 110. Accordingly, the digital rights license generator 135 may also be configured to generate the digital rights license based on the DRM information contained in the plurality of tags. For instance, the digital rights license generator 135 may generate the digital rights license by pre-hashing the DRM information along with the plurality of tags and/or fragments (and/or portions thereof) formed during fragmentation using a predetermined hashing algorithm, and including the hash results in the digital right license. In other words, the digital rights license may include hash results based on pre-hashing the content of the tags alone, the fragments alone, and/or combinations of the content of the tags and fragments and/or portions thereof. The digital rights license generator 135 is also configured to distribute the digital rights license to authorized parties, such as the user/client 130. For example, the digital rights license generator 135 may distribute the digital rights license to the user/client 130 separately from the plurality of tagged fragments, responsive to payment by the client 130 for access to the desired digital content file.

As such, the user/client 130 may include a fragment reassembly verifier 155 that is configured to receive the digital rights license from the digital rights license generator 135 over the network 120. The user/client 130 is also configured to retrieve ones of the plurality of tagged fragments of the digital content file from the fragment control/distribution block 110 and/or one or more of the fragment storage locations 125a-125f according to a particular file sharing protocol. Upon receipt of the digital rights license and at least some of the plurality of tagged fragments, the fragment reassembly verifier 155 is configured to reassemble the received tagged fragments to provide the digital content file using the digital rights license. More particularly, the fragment reassembly verifier 155 may perform a tag-by-tag comparison of tag information obtained from the received tagged fragments with the tag information included in the digital rights license. For example, if a representation derived from one or more of the received tagged fragments does not match a corresponding representation included in the digital rights license, the fragment reassembly verifier 155 may prevent further reassembly and/or reconstitution of the plurality of tagged fragments by the user/client 130. In addition, upon an invalid match, the fragment reassembly verifier 155 may prevent receipt of further fragment transfers from the fragment control/distribution block 110 and/or the fragment storage locations 125a-125f. Also, fragment reassembly verifier 155 may display an error indication at the user/client 130, and may include a link or other information allowing a user an opportunity to purchase the digital rights license to access the desired digital content file.

Accordingly, a digital rights license may be used as part of the fragment reassembly/reconstitution process in the file sharing system 100, such that proper reassembly may be impossible without the appropriate digital rights license. The digital rights license may contain special information that is verifiably relatable to the tags for each of the tagged file fragments. Thus, the digital rights license generator 135 and the fragment reassembly verifier 155 may be configured to provide a form of DRM by inserting and utilizing additional information in the tags, without necessarily requiring file encryption.

Still referring to FIG. 1, the file sharing system 100 may also include a deprecation controller 140. As used herein, the term "deprecate" means to invalidate and/or remove from use. For example, encryption algorithms that are deprecated may no longer be used after the time of deprecation. As such, the deprecation controller 140 is configured to re-tag the plurality of fragments with corresponding ones of a second plurality of tags, to provide a second plurality of tagged fragments for distribution that is different from the first plurality of tagged fragments. For example, the deprecation controller 140 may be configured to re-tag the plurality of fragments after a predetermined period of time, and/or after distribution of a predetermined number of files. More particularly, the deprecation controller 140 may be configured to re-fragment the digital content file into a second plurality of fragments, and then re-tag the second plurality of fragments with corresponding ones of the second plurality of tags to provide the second plurality of tagged fragments for distribution. For example, the deprecation controller 140 may be configured to re-fragment the digital content file into a different numbers of fragments and/or different fragment sizes than used for the first plurality of fragments. The deprecation controller 140 may also compare the second plurality of fragments with the first plurality of fragments to verify that the first and second plurality of fragments are different.

The deprecation controller 140 may be further configured to invalidate the first plurality of tagged fragments after providing the second plurality of tagged fragments, for example, by transmitting a message to the storage locations 125a-125f to delete the first plurality of fragments. As such, new fragments and tags may be provided periodically, at intermittent periods of time, and/or responsive to distribution of a predetermined number of files as desired, to reduce the likelihood that an attacker will have sufficient time to compromise the fragments and/or tags before they are no longer valid.

For example, the depreciation controller 140 may set a timer for each content file fragmentation instance to control the lifetime of each fragment and/or tag. More particularly, the timer (or other external command) may be used to trigger re-fragmentation of the file, re-tagging of the fragments, and/or re-distribution of the tagged fragments after predetermined periods of time. The depreciation controller 140 may also schedule deletion messages for particular fragment/tag versions, and may receive related acknowledgements from the fragment storage locations 125a-125f. The fragment/tag versions scheduled for deletion may be identified by a fragmentation version number respectively embedded therein. The depreciation controller 140 may also identify new ones of the fragment storage locations 125a-125f as storing the second plurality of tagged fragments responsive to re-fragmenting the digital content file, re-tagging the fragments, and distributing the second tagged fragments.

In addition, to provide DRM for the digital content file, the digital rights license generator 135 may be configured to generate a second digital rights license for the digital content file based on the second plurality of tags. The second digital rights license may be required for reassembly of the second plurality of tagged fragments. As such, the deprecation controller 140 may invalidate the first digital rights license after the predetermined period of time and/or after distributing a predetermined number of copies of the first and/or second digital rights licenses, for example, by transmitting a license deletion message to the fragment storage locations 125a-125f and/or to the user/client 130.

For example, the depreciation controller 140 may be configured to provide the second digital rights license via the digital rights license generator 135, and may distribute the second digital rights license via the fragment control/distribution block 110 responsive to receiving an acknowledgment from the fragment storage locations 125a-125f that the second plurality of tagged fragments have been received. The depreciation controller 140 may transmit the fragment/tag deletion messages responsive to receiving an acknowledgment of receipt of the second digital rights license. The depreciation controller 140 may also transmit a license deletion message for the first digital rights license after receiving acknowledgement that the first fragments and tags have been deleted from the fragment storage locations 125a-125f and/or the user/client 130. The depreciation controller 140 may also be configured provide an alert/alarm if an error should occur in the above-described process.

As shown in FIG. 1, the fragment storage locations 125a-125f may respectively be coupled to deletion agents 165a-165f. The deletion agents 165a-165f may be configured to receive the deletion messages for the prior fragment, tag, and/or license instances from the deprecation controller 140, perform the requested deletions, and provide acknowledgment messages to the deprecation controller 140. The deletion agents 165a-165f may be included at each of the fragment storage locations 125a-125f, or may be otherwise connected to the fragment storage locations 125a-125f via the network 120.

In addition, the user/client 130 may be coupled to a license expiry manager 160. The license expiry manager 160 is configured to receive the license deletion command from the deprecation controller 140 (either directly or via the user/client 130), perform the requested license deletion, and acknowledge the license deletion to the deprecation controller 140. The license expiry manager 160 may be included as a part of the user/client 130, or may be otherwise connected to the user/client 130 via the network 120.

Accordingly, file fragments and/or tags produced in a file sharing system 100, such as a P2P file sharing system, may be updated and/or otherwise refreshed periodically, at intermittent periods of time, and/or responsive to distribution of a predetermined number of files and/or licenses using a deprecation controller 140. The deprecation controller 140 may also actively invalidate distributed fragments and/or tags via messages sent to the fragment storage locations 125a-125f after distributing updated fragments and/or tags. As such, at least one valid instance of the fragments for a particular digital content file may always be available in the file sharing system. Additionally, a digital rights license for the digital content file may also be refreshed before deletion of the prior fragment instances and/or licenses, but after distribution of the refreshed fragments. Thus, the deprecation controller 140 may proactively update fragments, tags, and/or license information in the file sharing system 100 to provide additional security.

Still referring to FIG. 1, the file sharing system 100 may further include a PRN controller 145. The PRN controller 145 may be configured to operate in conjunction with the fragment control/distribution block 110 to generate a plurality of tags using a pseudo-random number (PRN) bit sequence, and tag at least some of the fragments with corresponding ones of the tags to provide a plurality of tagged fragments for distribution. PRN coding and associated transmitter-to-receiver alignment synchronization techniques are well-known in spread spectrum communications, such as military and cellular phone radio systems (including GSM and CDMA cellular systems).

More particularly, the PRN controller 145 may be configured to generate a PRN bit sequence using a predetermined PRN generation algorithm, divide the PRN bit sequence into a plurality of data fields, and select a particular offset in the PRN bit sequence. The data in each field may be a portion of the PRN sequence that can be represented by a specific random number. For example, the PRN content of each data field may be a series of bits that may be represented by a particular decimal number. The PRN controller 145 may correlate respective identification information corresponding to respective ones of the plurality of fragments to respective ones of the plurality of data fields of the PRN bit sequence using a predetermined correlation scheme. As such, the PRN controller 145 and the fragment control/distribution block 110 may be configured to generate and populate tags corresponding to the respective fragments with the correlated data fields and/or representations thereof to randomize the identification information in each tag. For example, each tag may be populated with a random decimal number representing the portion of the binary PRN sequence in the correlated data field. In addition, the identification information may include digital rights management (DRM) information used for reassembly of the tagged fragments to provide the digital content file, and/or sequencing information used to provide a predetermined sequence of reassembly for the tagged fragments.

The PRN controller 145 may define fields in the sequence, field lengths, and/or interleaving based on different information types. For example, DRM information may be correlated to every third field of the PRN sequence, while sequencing information may be correlated to every fifth field of the PRN sequence. In addition, the PRN controller 145 may select and define a different correlation scheme or other encoding/decoding method for different information types.

In addition, the PRN controller 145 may be configured to generate a decoding file for distribution separately from the plurality of tagged fragments. The decoding file is configured to allow recovery of the encoded information in each tag based on regeneration of the PRN bit sequence and the predetermined correlation scheme by authorized parties, such as the user/client 130. Also, the PRN controller 145 may be configured to generate a sequence description for distribution separately from the plurality of tagged fragments. The sequence definition is configured to allow regeneration and synchronization of the PRN bit sequence for reassembly of the plurality of tagged fragments by authorized parties. The sequence definition may be included in the decoding file, and/or may be provide in a separate file for distribution. Moreover, when a digital rights license is provided by the digital rights license generator 135 for reassembly of the fragments, the PRN controller 145 may send the sequence description and/or the decoding file to the digital rights license generator 135 for inclusion in the digital rights license.

As such, the user/client 130 may be coupled to a PRN decoder/synchronizer 150 that is configured to provide the digital content file based on regeneration of the PRN bit sequence and recovery of the respective identification information for the plurality of fragments. More particularly, the PRN decoder/synchronizer 150 is configured to re-generate the PRN bit sequence using the predetermined PRN algorithm responsive to receiving the sequence definition for the digital content file. Accordingly, based on the received sequence definition, the PRN decoder/synchronizer 150 may synchronize the starting point of the PRN bit sequence at the client 130 with the starting point used by the PRN controller 145 and the fragment control/distribution block 110 to fragment the file. Also, using the received decoding file, the PRN decoder/synchronizer 150 may recover the information from the tags respectively obtained from the tagged fragments received at the user/client 130. More specifically, the PRN decoder/synchronizer 150 may use the predetermined correlation scheme and/or other decoding method (used by the PRN controller 145 to encode the tag data) to determine the actual values of PRN-coded tag information at the user/client 130, and may reassemble the received tagged fragments based on the recovered tag information. The PRN decoder/synchronizer 150 may be included as a part of the user/client 130, or may be otherwise connected to the user/client 130 via the network 120.

In addition, when DRM is used in conjunction with the tagged fragments, the PRN decoder/synchronizer 150 may forward the decoded tag information to the fragment reassembly verifier 155 for verification using the received digital rights license, as discussed above. The PRN decoder/synchronizer 150 may also provide synchronization difficulty feedback messages to the fragment control/distribution block 110, which may adjust the fragment size (in future re-fragmentation operations) to optimize a tradeoff between the fragment size and PRN synchronization difficulty.

Accordingly, a PRN coding scheme may be used to provide a statistically random appearance to information that is stored within the tags for each fragment of a digital content file in the file sharing system 100, thus obscuring the workings of the system 100 to outside observers. Although the PRN algorithm is used by the PRN controller 145 to produce a stream of bits which appears random, the same stream of bits may be reproduced at the user/client 130 and/or other destination, such that the tags can be deciphered and the fragments can be appropriately reassembled based on the tag information. Additionally, the digital rights license generated by the digital rights license generator 135 may also be modified to include the PRN-coded data from the plurality of tags, to further strengthen the system 100 against attack.

Figures 2A, 2B:
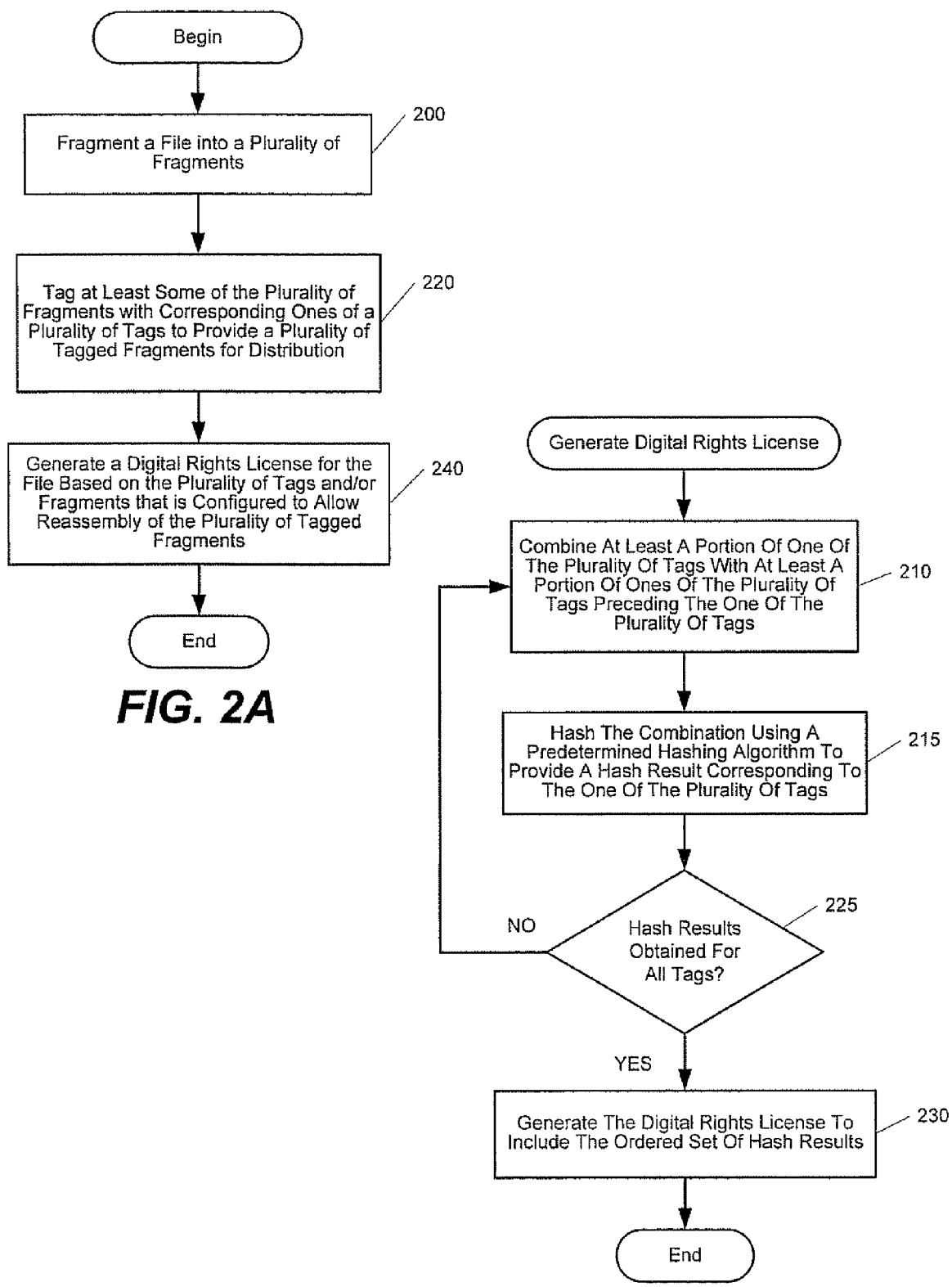
FIG. 2A is a flowchart illustrating exemplary operations for controlling distribution of digital content using license-based file fragmentation according to some embodiments of the present invention.
FIG. 2B is a flowchart illustrating operations for generating a digital rights license according to some embodiments of the present invention.

FIG. 2A is a flowchart illustrating exemplary operations for controlling distribution of digital content using license-based file fragmentation according to some embodiments of the present invention. Referring now to FIG. 2, operations begin at Block 200 by fragmenting a digital content file into a plurality of fragments. At Block 220, at least some of the plurality of fragments are tagged with corresponding ones of a plurality of tags. As such, a plurality of tagged fragments are provided for distribution in a file sharing system, such as a P2P system. The plurality of tags may each include identification information corresponding to respective ones of the plurality of fragments, which may be used to sequence the plurality of tagged fragments at a destination, such as the user/client 130 of FIG. 1.

In addition, a digital rights license for the digital content file is generated based on the plurality of tags and/or fragments at Block 240. The digital rights license is configured to allow reassembly of the plurality of tagged fragments to provide the digital content file. More particularly, the digital rights license may be required for reassembly of the plurality of tagged fragments, to prevent use of the digital content file by unauthorized parties. For example, the digital rights license may include a plurality of representations respectively derived from the plurality of tags, such as hash results obtained by hashing the plurality of tags. As such, the digital rights license may be used to prevent re-assembly of the plurality of tagged fragments if a representation derived from one of the tagged fragments does not match a corresponding one of the representations included in the digital rights license.

FIG. 2B is a flowchart illustrating operations for generating a digital rights license, such as illustrated in Block 240 of FIG. 2A. The plurality of tags used to generate the digital rights license respectively include sequencing information based on a predetermined sequence of re-assembly of the plurality of tagged fragments. As shown in FIG. 2B, at least a portion of one of the plurality of tags is combined with at least a portion of ones of the plurality of tags preceding the one of the plurality of tags (based on the predetermined sequence) to provide a combination at Block 210. Alternatively, at least a portion of one of the plurality of tags may be combined with a hash result corresponding to a preceding one of the plurality of tags to provide the combination.

At Block 215, the combination is hashed using a predetermined hashing algorithm at to provide a hash result corresponding to the one of the plurality of tags. At block 225, it is determined whether hash results have been obtained for all of the tags. If not, the steps of combining (Block 210) and hashing (Block 215) are repeated to provide an ordered set of hash results corresponding to the plurality of tags based on the sequencing information included therein. The digital rights license is generated to include the ordered set of hash results at Block 230.

The set of hash results included in the digital rights license may increase as the number of fragments used to distribute the digital content file increases. For example, two fragments may require two hash results to be included in the digital rights license: a hash of the tag information for the first fragment, and a hash of the concatenated tag information for the first and second fragments. Likewise, three fragments may require three hash results to be included in the digital rights license: a hash of the tag information for the first fragment, a hash of the concatenated tag information for the first and second fragments, and a hash of the concatenated tag information for the first, second, and third fragments. More generally, N fragments may require a set of N hash results to be included in the digital rights license. In addition, as mentioned above, each successive hash operation could concatenate a previous hash result and tag information for a next fragment, which may further improve efficiency and reduce cost. Also, a combination of these approaches may be used.

Accordingly, the digital rights license may be configured to prevent re-assembly of the plurality of tagged fragments if a hash result obtained using the predetermined hashing algorithm at a destination device, such as the user/client 130 of FIG. 1, does not match a corresponding one of the ordered set of hash results included in the digital rights license. More specifically, the digital rights license may prevent re-assembly and/or further downloading of the plurality of tagged fragments for a digital content file if a hash result obtained by hashing a combination of at least a portion of one of the plurality of tagged fragments and at least a portion of preceding ones of the plurality of tagged fragments does not match the corresponding hash result included in the digital rights license.

Additional description of operations for controlling distribution of digital content as discussed above with reference to in FIGS. 2A and 2B will now be provided. In particular, a digital content file may be fragmented, tagged, and distributed to multiple file storage locations in a file sharing system, such as a P2P system. For example, the digital content file may be a music file encoded in a MP3 format, which is well-known in the art. As each new fragment is formed, the fragment and/or its tag (or portions thereof) can be concatenated with one or more previous fragments and/or tags. Alternatively, the new fragment and/or tag (or portions thereof) can be concatenated with a hash result for one or more previous fragments and/or tags. For example, a hash result for a previous tag may be concatenated with the new fragment. The resulting string is then hashed, and the hash result is included in the digital rights license. For example, each tag may include DRM-specific information, which may be hashed and included as a set of hash results in the digital rights license. Any of a variety of well-known hashing algorithms, such as MD4, MD5, and/or SHA-1, may be employed to provide the hash results. In addition, newer hash algorithms that may be less vulnerable to attack, such as SHA-224, SHA-256, SHA-384, and/or SHA-512, may also be used. More generally, it is to be understood that the hash results included in the digital rights license may be generated by hashing any combination of fragments and/or tags (or portions thereof) with previous fragments and/or tags (or portions thereof) and/or hash results for the previous fragments and/or tags (or portions thereof).

The digital rights license including the ordered set of hash results is provided to authorized users via client software, based on their allowed access rights. The digital rights license may be in the form of a file, which may be distributed separately from the plurality of tagged fragments. For example, a user may request access to a particular digital content file via a P2P client software, and the file sharing system may locate the fragments of the file and begin transferring them to the user's client software. The fragments may arrive out of order, and as such, may be buffered and sequenced based on the information contained in the tags prior to reassembly/reconstitution. However, the digital rights license may be provided only to users/clients who have paid for access to the particular digital content file. Also, traditional encryption can be used to limit access to the license, for example, by encrypting the license and providing the decryption key only to users/clients who have paid for access. More generally, traditional encryption, decryption, and/or other protection methods may be employed in conjunction with embodiments of the present invention to control distribution of digital content.

To reconstitute the file, a fragment reassembly verification program included in and/or in communication with the client software locates and retrieves the information from each tag of a received fragment and/or the fragment itself, hashes the information using the predetermined hashing algorithm, and hash-by-hash compares the results to the corresponding ones of the ordered set of hash results retrieved from the digital rights license. More particularly, the fragment reassembly verification program concatenates information from each received tagged fragment with the information from previously received tagged fragments, and hashes the resulting string using the same hashing algorithm used to generate the ordered set of hash results in the license. This is repeated for each new fragment received, and the resulting hash results for the plurality of tagged fragments are compared to the set of hash results from the digital rights license. If the hash results match, the fragment reassembly verification program permits the client software to reconstitute the file. However, if any one of the hash results do not match, the fragment reassembly verification program prevents the client software from reassembling further fragments of the file. For example, if only the hash results corresponding to the first P tags and/or fragments match, only the first P fragments are reassembled. Thus, fragments P+1 through N are not reassembled, and that portion of the file remains inaccessible. Moreover, the fragment reassembly verification program also prevents reception of further fragments of the file at the client software. Thus, a complete transfer of the file fragments may be prevented.

As such, an unauthorized party may be prevented from accessing or even downloading an entire digital content file without the corresponding digital rights license. Moreover, such a tag-based licensing scheme may be more efficient than encryption/decryption-based DRM. More particularly, hashing may be less complex, less time-consuming, less computationally demanding, and therefore, less costly than traditional DRM. Also, as the tags (and/or hash results) may be significantly smaller than content files, performing operations on tags (even very many tags) may be more efficient than operating on the entire content file and/or on entire fragments of the content file, as with encryption/decryption-based DRM.

Accordingly some embodiments of the present invention provide methods, systems, and computer program products to utilize part of the fragmentation/reconstitution process to provide DRM, based on comparing the information included in the tags for each fragment with a digital rights license. Thus, access to digital content files and/or other fragmented items may be controlled by preventing reconstitution/reassembly of the fragments by unauthorized parties.

Figure 3:
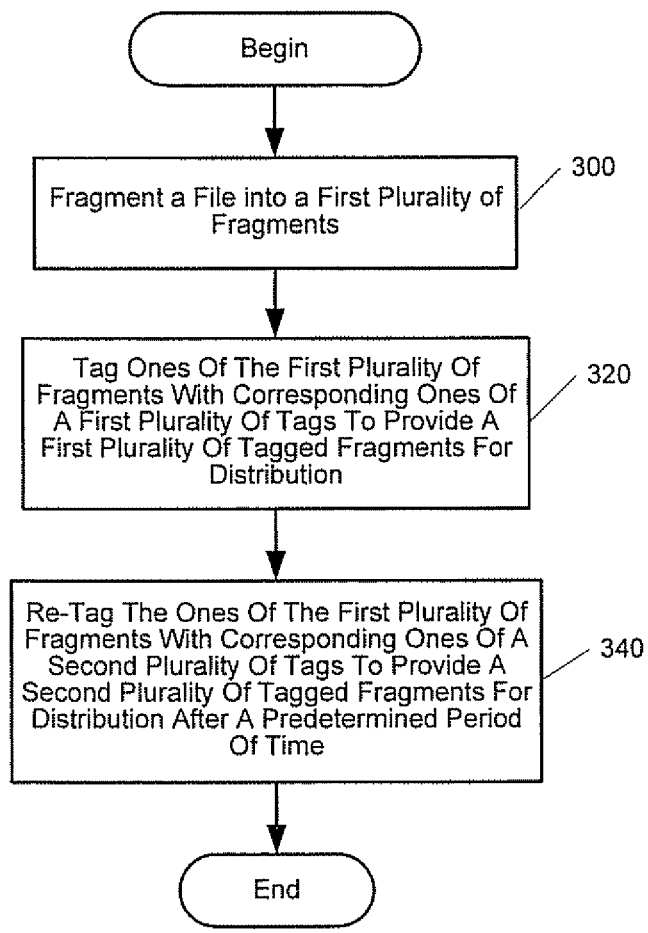
FIG. 3 is a flowchart illustrating exemplary operations for controlling distribution of digital content using time-limited file fragmentation according to some embodiments of the present invention.

FIG. 3 is a flowchart illustrating exemplary operations for controlling distribution of digital content using time-limited file fragmentation according to some embodiments of the present invention. Referring now to FIG. 3, operations begin at Block 300 by fragmenting a digital content file into a first plurality of fragments. At Block 320, some or all of the first plurality of fragments are tagged with corresponding ones of a first plurality of tags to provide a first plurality of tagged fragments for distribution in a file sharing system, such as a P2P system. The first plurality of tags may respectively include identification and/or other information corresponding to the first plurality of fragments. Later, the first plurality of fragments are re-tagged with corresponding ones of a second plurality of tags at Block 340. For example, the first plurality of fragments may be re-tagged after a predetermined period of time and/or after distribution of a predetermined number of files and/or fragments thereof. Accordingly, a second plurality of tagged fragments are provided for distribution.

More particularly, in some embodiments, the digital content file may be re-fragmented into a second plurality of fragments, and the second plurality of fragments may be re-tagged with corresponding ones of the second plurality of tags to provide the second plurality of tagged fragments. The second plurality of tagged fragments are different from the first plurality of tagged fragments. For instance, the digital content file may be re-fragmented into different numbers of fragments and/or into different fragment sizes to provide the second plurality of fragments.

In addition, the first plurality of tagged fragments may be invalidated responsive to generation of the second plurality of tagged fragments at Block 340. More particularly, the first plurality of tagged fragments may respectively include a first fragmentation version number, while the second plurality of tagged fragments may include a second fragmentation version number. The fragmentation numbers may be used to distinguish between the first plurality of tagged fragments and the second plurality of tagged fragments, so that the first plurality of tagged fragments can be deleted and/or otherwise invalidated after the re-tagging. The fragmentation version numbers may be sequential, or may be otherwise ordered.

Other information included the plurality of tags may also be made time-dependent, and as such, may be updated and/or refreshed after predetermined periods of time based on the re-fragmentation and re-tagging of the digital content file. For example, DRM information for use with a digital rights license may be periodically reassigned to each tag, and the digital rights license may be re-generated based on the DRM information in each tag. Prior digital rights licenses corresponding to prior fragmentation version numbers may also be invalidated, for example, at predetermined periods of time, at intermittent periods of time, and/or responsive to distribution of a predetermined number of copies of the prior digital rights licenses. As such, it may be more difficult for unauthorized parties to access the digital content file, due to the time-limited validity of the digital rights license and/or the plurality of tagged fragments. The fragment, tag, and/or digital rights license identification information included in each tag can be configured to identify the digital content file and/or fragmentation version number in any definable manner. For instance, each tag may include a concatenated data structure of the digital content file name, descriptive information for the corresponding fragment, and the fragmentation version number.

Additional description of operations for controlling distribution of digital content as discussed above with reference to in FIG. 3 will now be provided. In particular, a digital content file is fragmented, tagged, and distributed to multiple file storage locations in a file sharing system, such as a P2P system. For example, the digital content file may be a music file encoded in a MP3 format, and may be fragmented, tagged, and distributed according to a P2P file sharing protocol. As each new fragment is formed, a file fragmentation instance version number is included in each tag. More particularly, to support deprecation of a particular group of fragments, every tag may include identification information that is unique to both the particular digital content file and its fragmentation version number.

In addition, for DRM-protection of the digital content file, the information in each tag and/or fragment may be concatenated with information from one or more previous tags and/or fragment and hashed as each new fragment is formed. The set of hash results is included in a digital rights license, which may be provided to users based on their allowed access rights. To support deprecation, the digital rights license also includes identification information that is unique to the digital content file and its fragmentation version number. As such, both the digital rights license and the plurality of tagged fragments for a particular digital content file may be identified based on the fragmentation version number.

Based on a predetermined deprecation schedule, a timer is set that is specific to the digital content file and the fragmentation version number. Upon expiry of the timer after a predetermined period of time (and/or responsive to an external trigger/command), a new fragmentation version number is created, and the digital content file is re-fragmented and re-tagged to provide explicitly different fragments. For example, the parameters used for fragmentation, such as fragment sizes and/or total number of fragments, may be randomly changed to provide the different fragments. As each new fragment is formed, information in each fragment and/or corresponding tag (or portions thereof) is concatenated with information in one or more previous fragments and/or tags and hashed to provide a new set of hash results. The hash algorithm and/or method employed to provide the new hash results may be different from previously used hash algorithms and/or methods. For example, a different mathematical hashing algorithm may be used to provide the new hash results. In addition, the new hash results may be based on a concatenation of different portions of the tags and/or fragments, a different concatenation arrangement, and/or a different order of hashing the concatenated fragments and/or tags. A new digital rights license for the new fragmentation version number is generated to include the new set of hash results, and is provided to users based on their allowed access rights. As such, the new license includes a different set of hash results, and is invalid for use with fragments corresponding to a prior fragmentation version number. The new fragments and/or tags may be compared to the previous set to ensure that they are different.

Responsive to generation and distribution of the new tagged fragments and the new digital rights license, instructions to delete any stored fragments, tags, and/or licenses corresponding to the previous fragmentation version number are transmitted to fragment storage locations throughout the file sharing system. Acknowledgments from the fragment storage location are received after deletion of the fragments and/or copies of the digital rights licenses are provided. The management functions of the file sharing system are also pointed and/or re-directed to the storage locations in the file sharing system that contain the new fragments for the digital content file. As the previously generated fragments and/or digital rights licenses for a particular digital content file are not deleted prior to distribution of new fragments and/or license for the file, availability of the particular digital content file in the file sharing system may not be interrupted. An authorized user of the file sharing system may therefore request, retrieve, and reassemble the fragments of a desired digital content file as discussed above with reference to FIGS. 1 and 2A-2B.

However, in the embodiments discussed above with reference to FIGS. 1 and 2A-2B, should an unauthorized party somehow obtain and/or generate a copy of the digital rights license for a particular file and all of the fragments, the unauthorized party may use the license to reassemble/reconstitute the file. Once reassembled, the digital content file may be re-fragmented and/or otherwise distributed without DRM-protection. In contrast, by re-fragmenting the file, re-tagging the fragments, and re-generating the digital rights license for the digital content file after predetermined periods of time and/or after distribution of a predetermined number of fragments and/or licenses, the fragments and/or licenses may remain valid only for the predetermined time periods. For example, a particular fragmentation version of a digital rights license and the fragments of a corresponding file may be valid for a period of only fifteen minutes. As such, unauthorized parties may have a limited time period to retrieve all of the fragments and generate and/or otherwise obtain the information included in the digital rights license. A trade-off may exist between refresh frequency and security; however, for best security, refreshes may be performed relatively frequently.

Accordingly, other embodiments of the present invention provide methods, systems, and computer program products for proactively updating and/or refreshing of fragments and/or tags for a particular digital content file in a file sharing system. In addition, a digital rights license corresponding to the digital content file may also be proactively updated, so as to improve resistance to tampering or exploitation. As such, additional security may be provided.

Figure 4A:
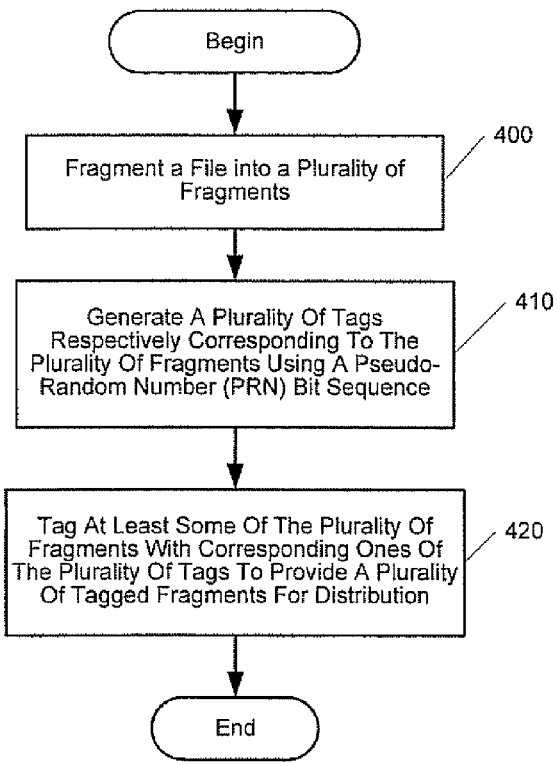
FIG. 4A is a flowchart illustrating operations for controlling distribution of digital content using pseudo-randomized file fragmentation according to some embodiments of the present invention.

FIG. 4A is a flowchart illustrating operations for controlling distribution of digital content using pseudo-randomized file fragmentation according to some embodiments of the present invention. Referring now to FIG. 4A, operations begin at Block 400 by fragmenting a digital content file into a plurality of fragments. As discussed above, the digital content file may be any type of digital data file, such as an MP3 file, which may be distributed over a file sharing system, such as a P2P system. At Block 410, a plurality of tags respectively corresponding to the plurality of fragments are generated using a pseudo-random number (PRN) bit sequence. For example, the plurality of tags may respectively include identification information for corresponding ones of the plurality of fragments that is encoded based on the PRN bit sequence. More particularly, the identification information may include digital rights management (DRM) information required for reassembly of the plurality of fragments to provide the digital content file. In addition, the identification information may include sequencing information indicating a predetermined sequence of reassembly for the plurality of fragments. As such, the PRN bit sequence may be used to obscure and/or randomize the appearance of the identification information contained in each tag and/or the tag itself. At least some of the plurality of fragments are tagged with corresponding ones of the plurality of tags at Block 420, to provide a plurality of tagged fragments for distribution.

Figure 4B:
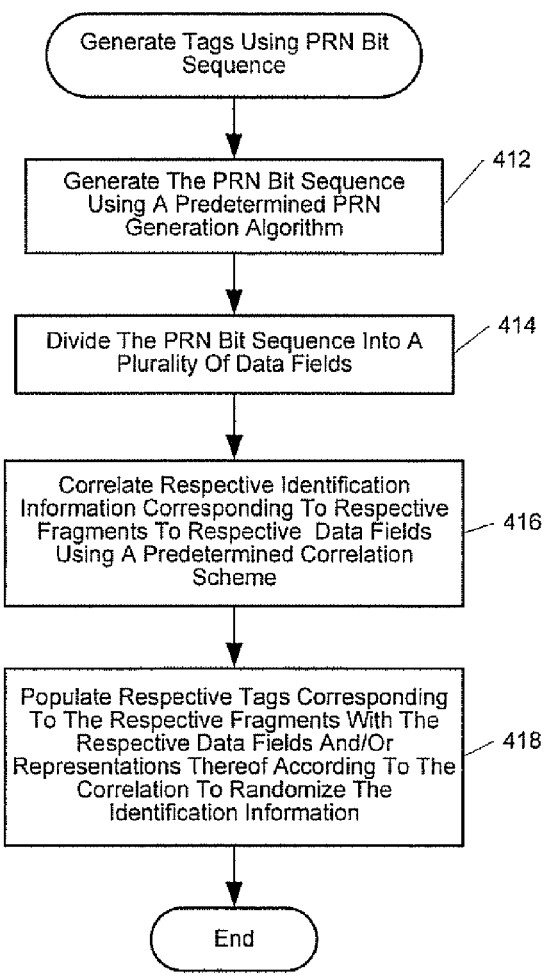
FIG. 4B is a flowchart illustrating operations for generating a plurality of tags using pseudo-randomized number coding schemes according to some embodiments of the present invention.

FIG. 4B is a flowchart illustrating operations for generating a plurality of tags using a PRN coding scheme, such as illustrated in Block 410 of FIG. 4A. As shown in FIG. 4B, the PRN bit sequence is generated using a predetermined PRN generation algorithm at Block 412. The PRN bit sequence is divided into a plurality of data fields at Block 414. For example, the PRN bit sequence may be divided into data fields having different field lengths based on the size of particular information types. At block 416, identification information corresponding to respective ones of the plurality of fragments are correlated to respective ones of the plurality of data fields using a predetermined correlation scheme.

For instance, the identification information for each fragment/tag may be correlated to sequential ones of the plurality of data fields based on a predetermined sequence of reassembly for the plurality of fragments. In addition, the identification information for each fragment/tag may be correlated to particular ones of the plurality of data fields based on particular information types. More particularly, a first type of information may be correlated to first ones of a group of data fields, while a second type of information may be correlated to second ones of a group of data fields. Also, a look-up table may be used to correlate the identification information to particular data fields of the PRN bit sequence. More generally, any suitable algorithm may be used for encoding each tag based on the PRN bit sequence. In addition, a predetermined starting point in the PRN bit sequence may be specified.

Still referring to FIG. 4B, once the tags have been generated using the PRN bit sequence, the plurality of tags (respectively corresponding to the plurality of fragments) are populated with the respective ones of the plurality of data fields and/or representations thereof at Block 418 according to the correlation described above. As such, the identification information contained in each tag may be randomized based on the correlation to the PRN bit sequence. Thus, it may be more difficult for unauthorized parties to reassemble the plurality of tagged fragments, as any reassembly information contained in the tags may be obscured.

In addition, once the fragments are tagged with corresponding ones of the plurality of tags, a decoding file may be generated for distribution separately from the plurality of tagged fragments. The decoding file is configured to allow recovery of the plurality of information based on the PRN bit sequence and the predetermined correlation scheme at a destination, such as the user/client 130 of FIG. 1. For example, where a look-up table is used to correlate the identification information in each tag to particular data fields of the PRN bit sequence, the decoding file may include the look-up table, so that it is available for decoding at the destination. Also, a sequence definition may be generated for distribution separately from the plurality of tagged fragments. The sequence definition may be included in the decoding file, or may be provided in a separate file. The sequence definition may identify the predetermined PRN generation algorithm and the predetermined starting point used in the encoding process, so that the PRN bit sequence may be re-generated at the destination and used to recovery of the information in each tag. As such, the decoding file and the sequence definition may allow regeneration and synchronization of the PRN bit sequence for reassembly of the plurality of tagged fragments to provide the digital content file.

Additional description of operations for controlling distribution of digital content as discussed above with reference to in FIGS. 4A and 4B will now be provided. In particular, a PRN bit sequence is generated, for example, using one of a number of well-known PRN generation algorithms, and a particular starting point along the ensuing PRN sequence is chosen. When a digital content file, such as a music file encoded in a MP3 format, is fragmented and tagged in a file sharing system, information in each tag may be correlated to different data fields along the PRN bit sequence to provide PRN coding of DRM and/or other tag information. For instance, N-bit data fields may be used to define $2^N$ different tags for $2^N$ different fragments. The particular algorithm and/or starting point are included in a suitable format to provide a sequence definition to be used for decoding the tag information at a destination. For example, the sequence definition may include the concatenation of an algorithm identifier and an offset for the starting point.

In addition, a different coding method may be chosen (e.g., based on a particular field ordering number, look-up table, algorithm, and/or a combination thereof) for each type of information to be PRN-coded. More particularly, different types of information may be correlated to interspersed and/or interleaved fields of the PRN bit sequence. For example, DRM information for each tag may be correlated to every fifth field of the PRN sequence, while sequencing information for each tag may be correlated to every tenth field. Also, sequential data fields may be used for information for each successive tag associated with each successive fragment of the original file. Sufficient field lengths may be chosen based on the size of the particular data. More specifically, for an information type that is N bits in length, a data field of N bits can be used. Also, different types of tag information can be correlated to data fields of the PRN bit sequence having different bit lengths.

For DRM-protection of the digital content file, the information in each tag and/or fragment may be concatenated with information from one or more previous tags and/or fragments and hashed as each new fragment is formed. The set of hash results is included in a digital rights license, which may be provided to users based on their allowed access rights. To support PRN coding of tag information, the sequence definition along with decoding tables, the particular decoding algorithm and/or other correlation scheme may be provided within the digital rights license. Alternatively, where DRM protection is not provided, the sequence definition and/or decoding scheme may be provided to authorized users in a separate communication.

As such, when an authorized user requests access to a desired digital content file via the file sharing system client software, the file sharing system (or related methods and/or computer program products) locates the tagged fragments for the file and the corresponding decoding file and transfers them to the user's client software. The file sharing system may provide the decoding file in a separate communication, for enhanced security. To decode the tag information in each fragment, PRN sequence-correlation is performed to synchronize the source sequence with the destination sequence, utilizing the decoding file (including the sequence definition) in addition to other well-known techniques, such as sliding correlation. More particularly, the PRN bit sequence is re-generated using the predetermined PRN algorithm and synchronized with the predetermined starting point used to generate the tags, based on the sequence definition for the digital content file. The client software (and/or PRN decoding/synchronization software associated therewith) uses the aligned copy of the PRN bit sequence to detect the correct sequence of the tags/fragments, by matching each tag to a data field of the PRN bit sequence and noting the sequence of that data field in the PRN bit sequence. Once synchronization is achieved, the received tagged fragments may be reassembled unless synchronization is lost, upon which re-synchronization may be performed. If synchronization is not achieved, additional fragments may be received and considered to obtain a larger sequence sample. Accordingly, identification information may be recovered from tags respectively obtained from received ones of the tagged fragments using the decoding file. An authorized user of the file sharing system may therefore request, retrieve, and reassemble the fragments of a desired digital content file as discussed above with reference to FIGS. 1 and 2A-2B.

However, in the embodiments discussed above with reference to FIGS. 1 and 2A-2B, should an unauthorized party somehow intercept and/or otherwise observe the information within the tags, the unauthorized party may uses the tag information (along with other ascertained aspects of the digital content file, license, and/or system operation) to determine how to compromise the particular file and/or the system operation. For example, via correlations and a variety of well-known hacking and reverse engineering principles, an unauthorized party may be able to reassemble and redistribute a desired digital content file without DRM protection, and/or cause system malfunction and/or other undesirable operation. In contrast, by using PRN code generation algorithms to produce pseudo-random bit-string codes and correlate the data fields of the PRN bit sequence to information corresponding to each tag of fragments of the original file, the information in each tag may be randomized and/or otherwise obscured to unauthorized parties. In addition, PRN coding may be employed with a digital rights license corresponding to the fragments of the file to obscure the data contained in the license. It should also be noted that PRN coding is more efficient and less computationally demanding than traditional encryption/decryption-based DRM. Although some tradeoffs may exist between fragment number/size and PRN synchronization difficulty, optimal parameters may be selected based on the particular digital content file.

Accordingly, further embodiments of the present invention provide methods, systems, and computer program products for encoding the tags corresponding to fragments of a digital content file based on a PRN bit sequence, to improve resistance to tampering or exploitation. In addition, a digital rights license corresponding to the digital content file may also be encoded based on the PRN bit sequence. Thus, additional security may be provided.

Figure 5:
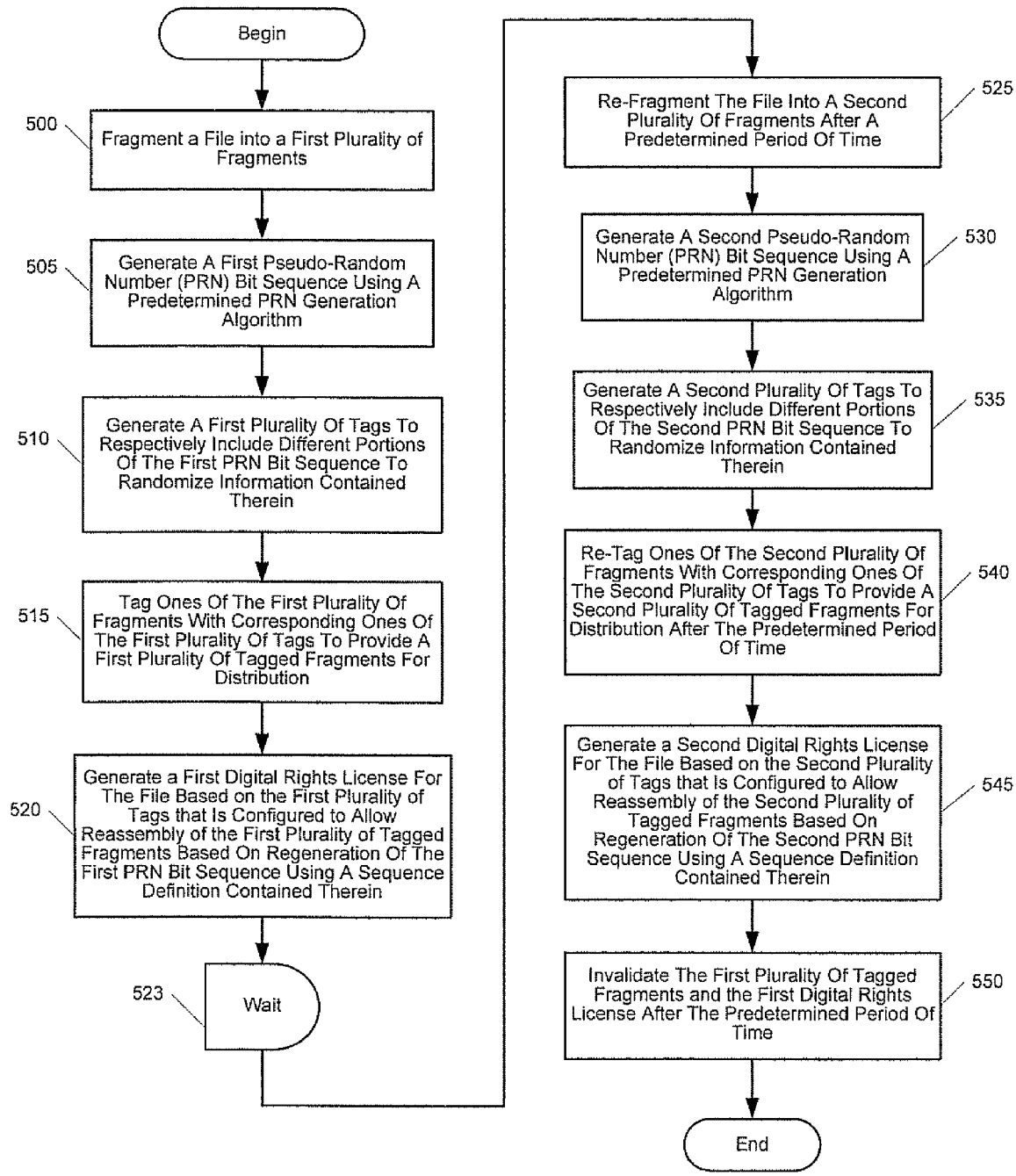
FIG. 5 is a flowchart illustrating operations for controlling distribution of digital content according to further embodiments of the present invention.

FIG. 5 is a flowchart illustrating exemplary operations for controlling distribution of digital content in a file sharing system according to further embodiments of the present invention. Referring now to FIG. 5, operations begin when a digital content file is fragmented into a first plurality of fragments at Block 500. A first PRN sequence is generated using a first PRN generation algorithm at Block 505, and a first plurality of tags is generated at Block 510. The first plurality of tags respectively include different portions of the first PRN bit sequence and/or respective representations thereof, such that the information contained in each tag is randomized. At Block 515, the first plurality of fragments are tagged with corresponding ones of the first plurality of tags to provide a first plurality of tagged fragments. The first plurality of tagged fragments are distributed throughout the file sharing system, for example, to a plurality of fragment storage locations.

In addition, a first digital rights license is generated at Block 520 based on the first plurality of tags, for distribution separately from the first plurality of tagged fragments. The first digital rights license is configured to allow reassembly and/or reconstitution of the first plurality of tagged fragments, for example, at a client device. More particularly, the first digital rights license includes decoding information and a sequence definition for the first PRN bit sequence, in addition to a first set of ordered hash results derived from the first plurality of tags. As such, the first PRN bit sequence may be regenerated at the client device using the sequence definition, and the information contained in each tag obtained from a corresponding tagged fragment may be determined based on the decoding information. The tags from the corresponding tagged fragments may be hashed at the client device, and a tag-by-tag comparison may be performed with the set of ordered hash results from the first digital rights license. If the hash results match the corresponding results included in the first digital rights license, the client device is able to reassemble the first plurality of tagged fragments to provide the digital content file. However, if the hash results do not match, reassembly and further reception of the first plurality of tagged fragments may be prevented. Accordingly, the first digital rights license is required for reassembly of the first plurality of tagged fragments.

Still referring to FIG. 5, a predetermined period of time is waited at Block 523. Then, the digital content file is re-fragmented into a second plurality of fragments at Block 525. For example, the digital content file may be periodically re-fragmented into different numbers of fragments and/or different fragment sizes, or may be re-fragmented at intermittent intervals of time. Also, the digital content file may be re-fragmented after distribution of a predetermined number of copies of the file, the fragments thereof, and/or the first digital right license. As such, at Block 530, a second PRN bit sequence is generated using a predetermined PRN generation algorithm. The second PRN generation algorithm may be different from the first PRN generation algorithm discussed above with reference to Block 505. A second plurality of tags is generated based on the second PRN bit sequence at Block 535. More particularly, the second plurality of tags may respectively include different portions of the second PRN bit sequence and/or respective representations thereof to randomize the information contained therein. At Block 540, the second plurality of fragments are re-tagged with corresponding ones of the second plurality of tags to provide a second plurality of tagged fragments for distribution in the file sharing system. The second plurality of tagged fragments are different from the first plurality of tagged fragments, although both represent the contents of the same digital content file.

At Block 545, a second digital rights license is generated for the digital content file based on the second plurality of tags, for distribution separately from the second plurality of tagged fragments. The second digital rights license is configured to allow reassembly and/or reconstitution of the second plurality of tagged fragments. More particularly, the second digital rights license includes decoding information and a sequence definition for the second PRN bit sequence, in addition to a second set of ordered hash results derived from the second plurality of tags. As such, the second PRN bit sequence may be regenerated at the client device using the sequence definition, and the second plurality of tagged fragments may be reassembled, for example, in a manner similar to that described above with reference to the first digital rights license.

However, as the second digital rights license is generated based on the second plurality of tags, the second digital rights license may not be used to reassemble the first plurality of tagged fragments, and vice versa. Accordingly, responsive to generation and distribution of the second plurality of tagged fragments and the second digital rights license, the first plurality of tagged fragments and the first digital rights license are invalidated by the file sharing system at Block 550, for example, based on a fragmentation version number respectively included. For example, the first plurality of tagged fragments and the first digital rights license may be invalidated periodically, at intermittent intervals of time, and/or responsive to distribution of a predetermined number of copies of the file and/or the first and/or second digital right licenses. In addition, a request to delete the first plurality of tagged fragments and the first digital license may be transmitted throughout the file sharing system, so that the second plurality of tagged fragments (and the accompanying second digital rights license) is the only version of the digital content file available in the file sharing system after the file has been re-fragmented and re-tagged.

Accordingly, the fragments of a digital content file distributed by a file sharing system, and the digital rights license associated therewith, may be proactively refreshed after predetermined periods of time based on different PRN bit sequences, and prior fragment versions may be invalidated. Thus, by using PRN-based tag generation and time-limited fragment, tag, and license validity, improved resistance to tampering and/or exploitation of the digital content file and/or the file sharing system by unauthorized parties may be provided.

In the drawings and specification, there have been disclosed typical embodiments of the invention, and, although specific terms are employed, they are used in a generic and descriptive sense only and not for purposes of limitation, the scope of the invention being set forth in the following claims.

The invention claimed is:

1. A method, comprising:
fragmenting a digital file into a plurality of unusable fragments;
tagging each unusable fragment with a tag to generate tagged unusable fragments; and
generating a digital rights license based on the tag that allows reassembly of the tagged unusable fragments into the digital file.

2. The method according to claim 1, further comprising preventing reassembly of the plurality of unusable fragments.

3. The method according to claim 1, further comprising deriving a representation of one of the unusable fragments from the tag.

4. The method according to claim 1, wherein fragmenting the digital file comprises dividing the digital file into the plurality of unusable fragments.

5. The method according to claim 1, further comprising distributing the tagged unusable fragments.

6. The method according to claim 1, further comprising distributing the tagged unusable fragments to different storage locations.

7. The method according to claim 1, further comprising distributing the tagged unusable fragments to a client device.

8. An apparatus, comprising:
a processor; and
memory storing code that when executed causes the processor to perform operations, the operations comprising:
fragmenting a digital file into a plurality of unusable fragments, wherein each of the plurality of unusable fragments is separately unusable;
tagging each unusable fragment with a tag to generate tagged unusable fragments; and
generating a digital rights license based on the tag that allows reassembly of the tagged unusable fragments into the digital file.

9. The apparatus according to claim 8, wherein the operations further comprise preventing reassembly of the plurality of unusable fragments.

10. The apparatus according to claim 8, wherein the operations further comprise deriving a representation of one of the unusable fragments from the tag.

11. The apparatus according to claim 8, wherein the operations further comprise dividing the digital file into the plurality of unusable fragments.

12. The apparatus according to claim 8, wherein the operations further comprise distributing the tagged unusable fragments.

13. The apparatus according to claim 8, wherein the operations further comprise distributing the tagged unusable fragments to different storage locations.

14. The apparatus according to claim 8, wherein the operations further comprise distributing the tagged unusable fragments to a client device.

15. A memory storing instructions that when executed cause a processor to perform operations, the operations comprising:
  fragmenting a digital file into a plurality of unusable fragments;
  tagging each unusable fragment with a tag to generate tagged unusable fragments; and
  generating a digital rights license based on the tag that allows reassembly of the tagged unusable fragments into the digital file.

16. The memory of claim 15, wherein the operations further comprise preventing reassembly of the plurality of unusable fragments.

17. The memory of claim 15, wherein the operations further comprise deriving a representation of one of the unusable fragments from the tag.

18. The memory of claim 15, wherein the operations further comprise dividing the digital file into the plurality of unusable fragments.

19. The memory of claim 15, wherein the operations further comprise distributing the tagged unusable fragments to different storage locations.

20. The memory of claim 15, wherein the operations further comprise distributing the tagged unusable fragments to a client device.

* * * * *